(12) United States Patent
Aggarwal et al.

(10) Patent No.: US 10,282,979 B2
(45) Date of Patent: May 7, 2019

(54) TRANSMISSION OF INFRARED SIGNALS OVER A HIGH-DEFINITION MULTIMEDIA INTERFACE CABLE

(71) Applicant: Caavo Inc, Milpitas, CA (US)

(72) Inventors: Ashish Dharmpal Aggarwal, Stevenson Ranch, CA (US); Sharath Hariharpur Satheesh, Bangalore (IN); Pankaj Ramesh Chandra Katiyar, Nagpur (MH); Conrad Savio Jude Gomes, Salcete (GA); Ashok Kumar Kethe, Krishna district (AP); Bitto Niclavose, Kottayam (IN)

(73) Assignee: Caavo Inc, Milpitas, CA (US)

( * ) Notice: Subject to any disclaimer, the term of this patent is extended or adjusted under 35 U.S.C. 154(b) by 0 days.

(21) Appl. No.: 15/857,256

(22) Filed: Dec. 28, 2017

(65) Prior Publication Data

US 2018/0190109 A1 Jul. 5, 2018

(30) Foreign Application Priority Data

Dec. 30, 2016 (IN) .............................. 201641044971

(51) Int. Cl.
| | |
|---|---|
| *H04B 10/00* | (2013.01) |
| *G08C 23/06* | (2006.01) |
| *H04Q 11/00* | (2006.01) |
| *H04L 12/46* | (2006.01) |
| *H04L 12/28* | (2006.01) |
| *H04B 10/2581* | (2013.01) |

(52) U.S. Cl.
CPC .......... *G08C 23/06* (2013.01); *H04L 12/4625* (2013.01); *H04Q 11/0005* (2013.01); *H04B 10/2581* (2013.01); *H04L 12/2805* (2013.01)

(58) Field of Classification Search
USPC ................................... 398/106–114
See application file for complete search history.

(56) References Cited

U.S. PATENT DOCUMENTS

| | | | |
|---|---|---|---|
| 7,400,801 B1 * | 7/2008 | Tong .................... | G02B 6/1228 385/14 |
| 7,706,692 B2 * | 4/2010 | Tatum .................. | G02B 6/4246 398/139 |
| 7,729,618 B2 * | 6/2010 | Tatum ..................... | G06F 13/28 398/138 |
| 7,768,421 B2 * | 8/2010 | Suzuki ................... | G08C 17/00 340/12.14 |

(Continued)

*Primary Examiner* — Agustin Bello
(74) *Attorney, Agent, or Firm* — Fiala & Weaver P.L.L.C.

(57) ABSTRACT

Embodiments described herein enable the transmission of infrared (IR) signals via an AV cable containing a plurality of signal lines. In embodiments, an IR receiver, and IR emitter, and/or logic circuitry may be integrated within an AV cable (e.g., an HDMI cable) to enable transmitting signals from an IR remote control device to a media device that may be located behind a physical obstruction through which IR signals are unable to pass. By utilizing one or more signal lines of an AV cable to transmit IR signals, existing AV communication protocols may continue to be utilized in a user's home entertainment system. In this manner, a user may be able to locate one or more media devices (e.g., home entertainment devices) in a physically remote location, such as in a cabinet or closet, without sacrificing any IR signaling functionality.

20 Claims, 9 Drawing Sheets

(56) References Cited

U.S. PATENT DOCUMENTS

| | | | | |
|---|---|---|---|---|
| 7,860,398 B2* | 12/2010 | Tatum | G02B 6/4201 | 398/139 |
| 8,150,261 B2* | 4/2012 | Tzeng | G08C 17/02 | 385/88 |
| 8,233,805 B2* | 7/2012 | Tatum | G02B 6/4201 | 398/110 |
| 8,276,005 B2* | 9/2012 | Bae | G09G 5/006 | 345/204 |
| 8,350,837 B2* | 1/2013 | Kuroda | G06F 1/3218 | 345/100 |
| 8,824,898 B2* | 9/2014 | Groepl | G09G 5/006 | 370/252 |
| 8,935,740 B2* | 1/2015 | Suzuki | H04B 10/12 | 725/149 |
| 9,148,609 B2* | 9/2015 | Shintani | H04N 5/4403 | |
| 9,397,750 B2* | 7/2016 | Parekh | G02B 6/4293 | |
| 9,397,751 B2* | 7/2016 | Parekh | H04B 10/2503 | |
| 9,641,250 B2* | 5/2017 | Jiang | G02B 6/4274 | |
| 9,813,153 B2* | 11/2017 | Parekh | H04B 10/25 | |
| 9,813,154 B2* | 11/2017 | Parekh | H04B 10/2503 | |
| 9,971,115 B2* | 5/2018 | Jiang | G02B 6/4274 | |
| 9,979,479 B2* | 5/2018 | Parekh | G02B 6/4293 | |
| 9,979,481 B2* | 5/2018 | Parekh | H04B 10/2503 | |
| 2003/0132941 A1* | 7/2003 | Echizenya | G09G 5/006 | 345/520 |
| 2004/0155809 A1* | 8/2004 | Eyer | G08C 23/04 | 341/176 |
| 2006/0067690 A1* | 3/2006 | Tatum | G02B 6/4246 | 398/66 |
| 2006/0077778 A1* | 4/2006 | Tatum | G02B 6/4246 | 369/44.11 |
| 2006/0093280 A1* | 5/2006 | McColloch | G02B 6/4201 | 385/81 |
| 2007/0003288 A1* | 1/2007 | Tong | G02B 6/0288 | 398/142 |
| 2007/0058976 A1* | 3/2007 | Tatum | G02B 6/4201 | 398/99 |
| 2007/0286600 A1* | 12/2007 | Guo | H04B 10/1143 | 398/43 |
| 2010/0183053 A1* | 7/2010 | Tran | H04L 5/0008 | 375/219 |
| 2011/0091219 A1* | 4/2011 | Tatum | G02B 6/4201 | 398/142 |
| 2012/0019400 A1* | 1/2012 | Patel | G08C 17/00 | 340/870.15 |
| 2012/0249871 A1* | 10/2012 | Nguyen | H04B 10/40 | 348/441 |
| 2012/0249890 A1* | 10/2012 | Chardon | H04N 5/44 | 348/734 |
| 2013/0070153 A1* | 3/2013 | Hill | H04N 21/42228 | 348/569 |
| 2013/0107022 A1* | 5/2013 | Shintani | H04N 7/181 | 348/51 |
| 2014/0023375 A1* | 1/2014 | Gilson | G08C 17/02 | 398/106 |
| 2015/0110499 A1* | 4/2015 | Jiang | G02B 6/4274 | 398/139 |
| 2015/0295647 A1* | 10/2015 | Parekh | H04B 10/2503 | 398/142 |
| 2016/0125733 A1* | 5/2016 | Sallas | G08C 23/04 | 398/106 |
| 2016/0301473 A1* | 10/2016 | Parekh | H04B 10/2503 | |
| 2018/0012485 A1* | 1/2018 | Park | G08C 23/04 | |
| 2018/0062742 A1* | 3/2018 | Parekh | G02B 6/3588 | |
| 2018/0190109 A1* | 7/2018 | Aggarwal | G08C 23/06 | |

* cited by examiner

TRANSMISSION OF INFRARED SIGNALS OVER A HIGH-DEFINITION MULTIMEDIA INTERFACE CABLE

CROSS-REFERENCE TO RELATED APPLICATIONS

This application claims foreign priority to Indian Patent Application No. 201641044971, filed on Dec. 30, 2016, the entirety of which is incorporated by reference herein.

BACKGROUND

Technical Field

The subject matter of the present application relates to the transmission of infrared (IR) signals over one or more signal lines of an audio/video (AV) cable.

Background Art

The number of media devices in a living room is ever-growing. For instance, a typical home entertainment system may include numerous multimedia devices of different types, such as a television (TV), a cable/satellite set-top box (STB), a video game console such as Xbox™ or Playstation™, one or more media streaming devices, such as Roku™, AppleTV™, Chromecast™, and a host of other devices, such as Blu-Ray™ players, digital video disc (DVD) and compact disc (CD) players. Very often, source devices (e.g., STB, video game console, media streaming device) are connected by an audio-video receiver (AVR) to sink devices (e.g., televisions, loudspeakers) in a home entertainment system.

Many of these devices are controlled via an infrared (IR) remote control device (also known as a "remote control" or "remote"). Some devices may be controlled via radio frequency (RF), Internet Protocol (IP), Bluetooth (BT) and High-Definition Multimedia Interface (HDMI)-based control schemes, among other control types. As a result, the number of remotes required to control these devices also grows proportionately to the number of devices used by the user. In order to simplify the control of all these devices, a Home Automation Control System may be used (e.g., Control4®, Logitech Harmony®, etc.), which provides the user a single-point control device, such as a hand held remote, a tablet or a computer. Moreover, each device in a home entertainment system, including a hub or AVR, typically has several cables connected (e.g., a power cable, one or more audio or video cables, a network cable, etc.), often resulting in a cluttered arrangement. As a result, for aesthetic reasons, a user may choose to hide their home entertainment equipment behind walls, in cabinets/closets, or behind other physical obstructions (such as furniture).

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for enabling the transmission of IR signals via one or more signal lines of an AV cable. An IR receiver, IR emitter, and/or logic circuitry may be integrated within the AV cable to convert IR signals received from an IR remote control device to electronic signals, and to transmit the electronic signals to a media device located behind a physical obstruction through which IR signals are unable to pass. By utilizing one or more signal lines of an AV cable to transmit IR signals, existing AV communication devices and protocols may be used in a home entertainment system. In this manner, media devices of a home entertainment system may be positioned in physically remote locations, such as a cabinet or closet, without sacrificing IR signaling functionality.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements.

Figure 1:
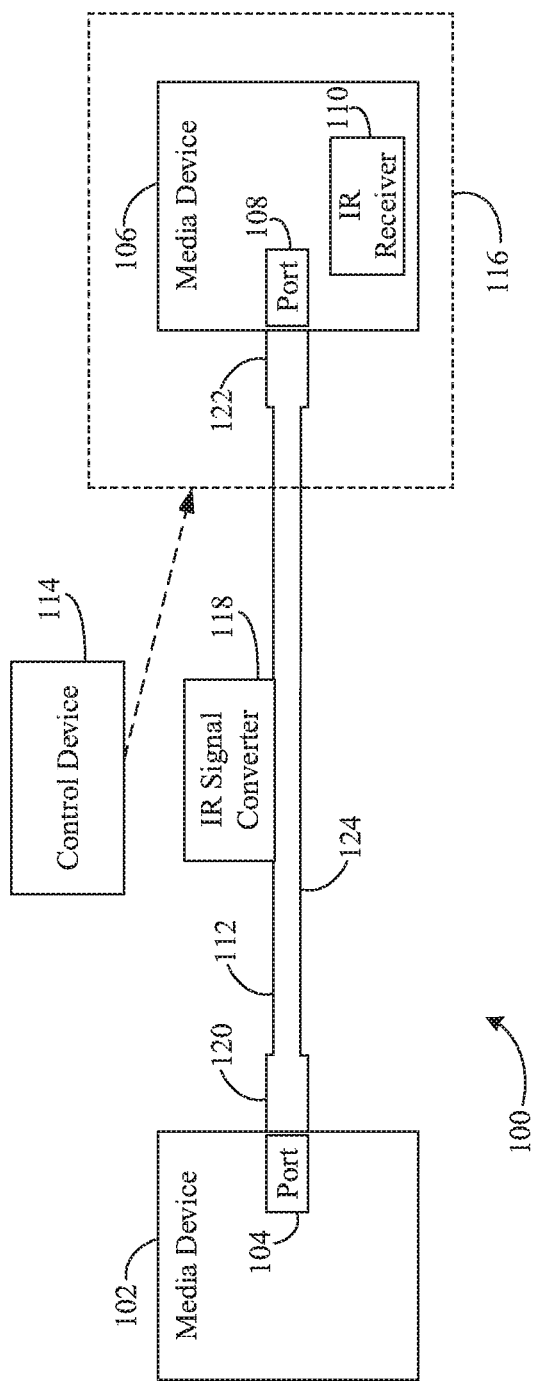
FIG. 1 is a block diagram of a home entertainment system including an AV cable that incorporates an IR signal converter, according to an example embodiment.

Additionally, the left-most digit(s) of a reference number identifies the drawing in which the reference number first appears.

DETAILED DESCRIPTION

Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," "front," "rear," etc.) used herein are for purposes of illustration only, and that practical implementations of the structures described herein can be spatially arranged in any orientation or manner.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner.

Example Embodiments

The number of media devices in the home is ever-growing. The number of remotes required to control these devices has grown proportionately to the number of media devices present. To simplify the control of all these media devices, a Home Automation Control System may be used (e.g., Control4®, Logitech Harmony®, etc.), which provides the user a single-point control device, such as a hand held remote, a tablet or a computer. Moreover, each device in a home entertainment system, including a hub or AVR, typically has several cables connected (e.g., a power cable, one or more audio or video cables, a network cable, etc.), often resulting in a cluttered arrangement. As a result, users may choose to hide their home entertainment equipment behind walls, in cabinets/closets, or behind other physical obstructions (such as furniture) through which IR signals cannot pass. While hiding of such equipment may be aesthetically pleasing to the user, the utilization of IR remote controls becomes compromised if a line of sight between the IR remote control and the IR controlled device is not available.

Example embodiments described herein enable the transmission of IR signals via one or more signal lines of an AV cable. By doing so, a user may advantageously be able to control a device regardless of whether the IR remote control is in proximity of the device or whether any physical obstructions exist between the remote control and the device that may otherwise hinder the transmission of IR signals from the remote control. In some embodiments, the foregoing techniques may be achieved by incorporating active logic circuitry and/or low powered microcontrollers into an AV cable (e.g., an HDMI cable).

In addition, because IR signals (or information therefrom) may be transmitted on one or more signal lines of an AV cable, existing AV communication protocols may continue to be utilized in the user's home entertainment system. For instance, when the foregoing features enabling IR transmissions in an AV cable are incorporated in an HDMI cable, the overall number of devices and cables in the user's system does not have to change. In this manner, a user may be able to position one or more media devices (e.g., home entertainment devices) in a physically remote location, enabling the user to hide such devices and connected cables from plain view without having to compromise on aesthetics or any IR signaling functionality.

Accordingly, numerous techniques are described herein that enable the transmission of information of IR signals to another device (e.g., one located behind a physical obstruction) via one or more signal lines of an AV cable. Subsection I.A describes embodiments directed to transmission of IR signals over a signal line of an AV cable to a device with an IR receiver located in a cabinet/closet. Section II.B describes embodiments directed to transmission of IR signals to an IR controller positioned in a cabinet/closet using active logic circuitry or a microcontroller to switch between an IR receiver mode and an IR emitter mode. For instance, in Section II.B.1, embodiments are described in which IR signals are transmitted over an HDMI Ethernet Audio Control or an Audio Return Channel signal line. In Section II.B.2, embodiments are described in which IR signals may be transmitted over a Display Data Channel signal line of an AV cable. In Section II.B.3, embodiments are described in which IR signals may be transmitted via a Consumer Electronics Control signal line of an AV cable. Section II.C describes embodiments for transmitting IR signals to non-IR capable devices. Section II.D describes embodiments directed at implementing the techniques described herein in a cable extension (e.g., as an HDMI cable extension).

I. IR Transmission Over an HDMI Cable

A. IR Over an AV Cable for Devices with an IR Receiver in a Cabinet/Closet

FIG. 1 is a block diagram of a home entertainment system 100 including an AV cable 112 that incorporates an IR signal converter 118, according to an example embodiment. System 100 includes a first media device 102, a second media device 106, an AV cable 112, and an IR remote control 114. AV cable 112 includes an IR signal converter 118, first and second connectors 120 and 122, and a wire bundle 124.

First media device 102 comprises an AV port 104 coupled via AV cable 112 to an AV port 108 of second media device 106. In the example of FIG. 1, media device 102 may be a display device (e.g., a television (TV), a protector, etc.), and media device 106 may be a device providing content to the display device. As shown in FIG. 1, media device 106 may be controlled using an IR remote control 114 by receiving IR signals via an IR receiver 110. However, in FIG. 1, media device 106 is placed in behind a physical obstruction 116 (e.g., in a closet, behind a door/wall, in a cabinet, etc.). Due to physical obstruction 116, a line of sight is not available between IR remote control 114 and IR receiver 110. Accordingly, IR remote control 114 is not able to directly control media device 106 using IR signals, resulting in a decrease in functionality and the overall enjoyment and satisfaction associated with the end user experience. However, as shown in FIG. 1, AV cable 112 includes IR signal converter 118. IR signal converter 118 is configured to receive and convert IR signals transmitted by IR remote control 114 into information, and to transmit the information over AV cable 112 to be received by media device 106 (e.g., via IR or otherwise, such as through one or more signal lines of the AV cable), thereby overcoming the problem of media device 106 being positioned behind physical obstruction 116.

Accordingly, embodiments are described herein for AV cables equipped with IR signal converter 118 to enable communications between IR remote controls and media devices that would ordinarily not be possible due to a lack of line of sight (e.g., as a result of a physical obstruction), or due to a media device not having any native IR capabilities. In such embodiments, IR signal converter 118 may be integrated with an AV cable in any fashion, including being an external attachment to a connector or the cable wires between connectors, or being integrated into a connector and/or the cable wires (e.g., within the wiring covering). Although IR signal converter 118 is shown in FIG. 1 as a single block, IR signal converter 118 and its components and/or subcomponents may be integrated at one or more points on AV cable, including at one or more points between connectors or attached to one or more connectors at the ends. Furthermore, any number of IR signal converters 118, and/or portions thereof, may be integrated or connected with a same AV cable. AV cable 112 of FIG. 1 is an example of an AV cable that may incorporate embodiments. Connectors 120 and 122 may each be any type of connector, including female (e.g., ports) or male (e.g., pins), such as HDMI connectors, or pin-less connectors. AV cable 112 may include a single cable (e.g., an HDMI cable), or multiple cables (e.g., separate dedicated cables for audio and video signals). Wire bundle 124 may include any number of one or more wires, and may be covered/sheathed in a material, such as plastic or metal, and may include shielding. Wire bundle 124 may also include one or more optical fibers through which AV signals may be transmitted via pulses of light.

Figure 2:
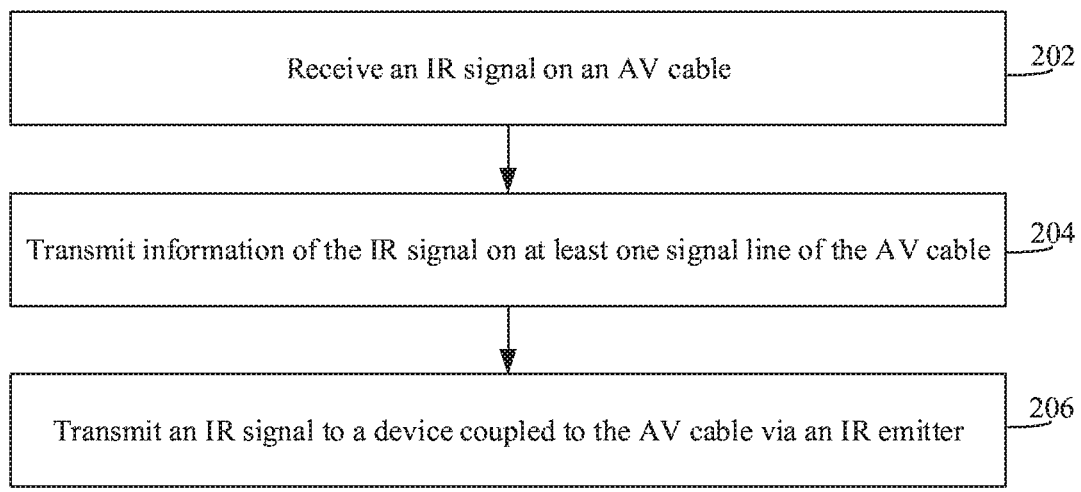
FIG. 2 depicts a flowchart of a method for transmitting an IR signal via an AV cable in accordance with an embodiment.
Figure 3:
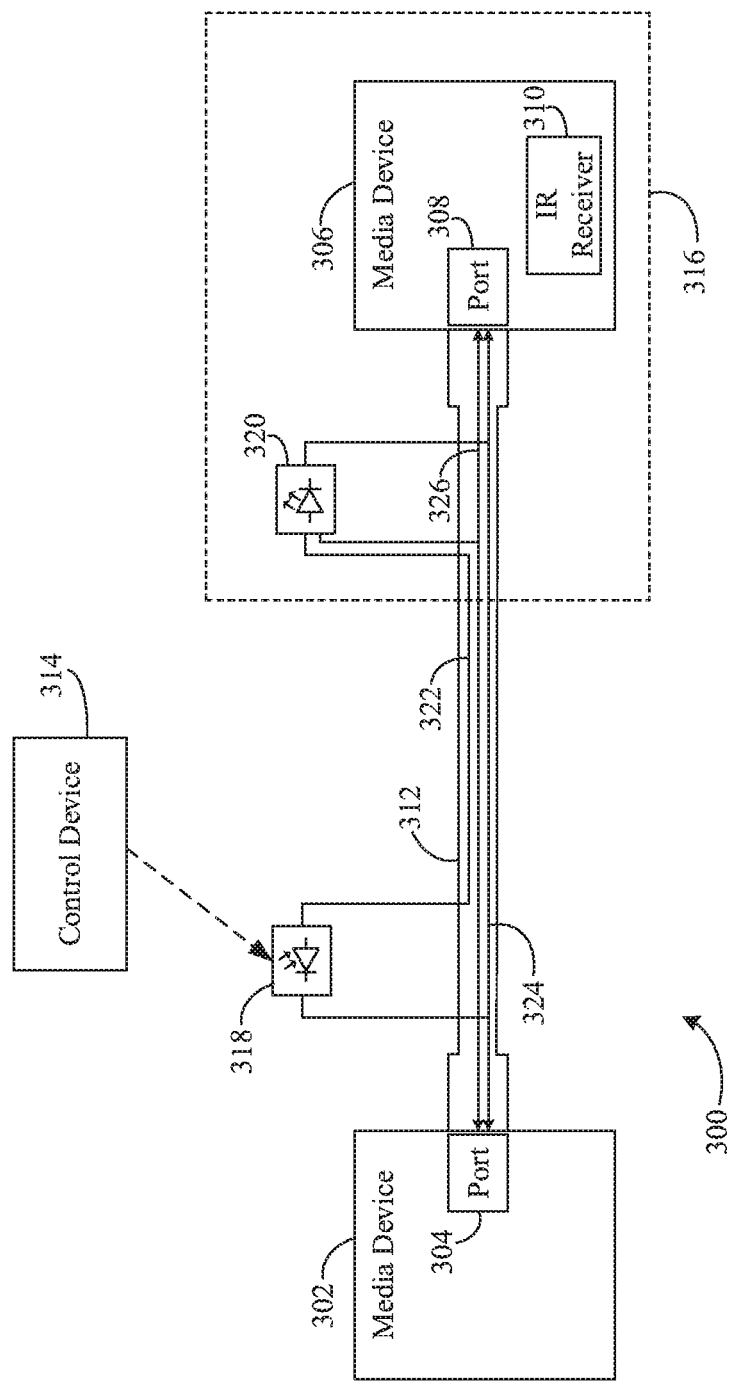
FIG. 3 is a block diagram of a home entertainment system configured to enable the transmission of an IR signal to a media device located behind a physical obstruction via an AV cable in accordance with an embodiment.

For example, FIG. 2 shows a flowchart 200 for enabling the transmission of an IR signal to a media device located behind a physical obstruction, according to an example embodiment. For purposes of illustration, flowchart 200 of FIG. 2 is described with respect to FIG. 3. FIG. 3 shows a block diagram of a home entertainment system 300 configured to enable the transmission of an IR signal to a media device located behind a physical obstruction via an AV cable, according to an example embodiment. As shown in FIG. 3, system 300 includes a media device 302, a media device 306, an AV cable 312, and a control device 314. AV cable 312 includes an IR receiver 318, an IR emitter 320, and lines 322, 324, and 326. IR receiver 318 and IR emitter 320 comprise an embodiment of IR signal converter 118. Media device 302 includes an AV port 304. Media device 306 includes an AV port 308, and an IR receiver 310. Flowchart 200 and system 300 are described as follows. Further structural and operational embodiments will be apparent to persons skilled in the relevant art(s) based on the following description.

Flowchart 200 begins with step 202. In step 202, an IR signal is received on an AV cable. For example, as shown in FIG. 3, control device 314 transmits an IR signal that is received by IR receiver 318. Control device 314 may be any type of remote control device that is configured to operate media device 306 that may be located behind a physical obstruction 316 as shown in FIG. 3 by transmitting one or more IR signals comprising one or commands Control device 314 may comprise any suitable user interface, including a physical user interface, graphical user interface, voice-based user interface, or the like. For instance, control device 314 may comprise physical interface elements, such as, but no limited to, a power button, a volume up button, a volume down button, number keys, and/or letter keys. Control device 314 may include a display screen and/or one or more physical interface elements (e.g., buttons, sliders, jog shuttles, etc.). In accordance with an embodiment, the display screen (or a portion thereof) may be a capacitive touch display screen. The display screen may be configured to display one or more virtual interface elements (e.g., icons, buttons, search boxes, etc.). One or more of the user interface elements on control device 314 may be activated when pressed (e.g., such interface elements may be click-sensitive), rather than simply being touched. This advantageously enables control device 314 to unambiguously determine that a user intended to activate such interface element(s) instead of accidentally touching such interface element(s). In accordance with one or more embodiments, one or more of interface elements may provide tactile feedback when activated. Actuation of any one of the user interface elements may cause control device 314 to transmit a signal to IR receiver 318, as shown in FIG. 3. Control device 314 may be a dedicated remote control (e.g., used to control a single media device 306) or a universal remote control configured to control a plurality of media devices, including media device 306, by transmitting IR signals.

In embodiments, media device 306 may comprise any type of home entertainment device for providing multimedia content (e.g., audio and/or video signals) for playback on another media device 302 via AV cable 312. For example, media device 306 may be a Blu-ray player, a set-top box (STB) (e.g., a device used to access a cable TV feed, a satellite TV feed, an antenna-based TV feed, etc.), a video game console, a streaming media device (e.g., an Internet streaming device such as a Roku™ device, an AppleTV™ device, a Chromecast™, etc.), or any other device for streaming multimedia content from a plurality of content sources, such as any one of a number of Internet streaming services (e.g., Netflix®, Hulu®, HBO Go®, etc.). Media device 306 may also comprise a multimedia switching device configured to couple a plurality of multimedia devices (not shown in FIG. 1). Media device 302 is configured to receive multimedia content (e.g., audio and/or video signals) for playback. For instance, media device 302 may include a television, High-Definition television (HDTV), a projector, a monitor, etc.

As shown in FIG. 3, port 304 of media device 302 and port 308 of media device 306 may be coupled together via AV cable 312. AV cable 312 may be any type of cable, coupler, wire, etc. suitable for transmitting an audio and/or video signal between ports 304 and 308 of media devices 302 and 306, respectively. AV cable 312, as described herein, may contain a plurality of signal lines (e.g., one or more signal lines configured to carry audio signals, one or more signal lines configured to carry video signals, one or more signal lines to carry control signals, etc.). In embodiments, AV cable 312 may comprise an HDMI cable or other type of audio/video interface cable, such as a video graphics array (VGA) cable, a universal serial bus (USB) cable, digital video interface (DVI) cable, a DisplayPort interface, a component video interface, a composite video interface, and a coaxial video interface.

IR receiver 318 is configured to receive one or more IR signals transmitted from control device 314 to control media device 306. IR receiver 318 may comprise a photodiode, a phototransistor, one or more photoelectric cells, etc. or any other device capable of receiving IR signals from control device 314. In embodiments, the IR signals received by IR receiver 318 may include any type of command to control media device 306, including without limitation a request to power on or off the media device 306, launch a particular application or multimedia content (e.g., a television show or a movie), record or play multimedia content, change a television channel, change a volume, conduct a search on media device 306, navigate a user interface of media device 306 (e.g., displayed by media device 302), etc.

In an embodiment, IR receiver 318 may be integrated with AV cable 312. For instance, IR receiver 318 may comprise a receiver located in-line with AV cable 312, or as an extension on the side or on the end of AV cable 312. In embodiments, IR receiver 318 may be located at any point on AV cable 312 away from physical obstruction 316. For example, IR receiver 318 may be integrated with AV cable 312 near an end of AV cable 312 proximal to media device 302, such that IR signals from control device 314 may be directed in the vicinity of media device 302 (e.g., a TV) during operation. In other embodiments, IR receiver 312 may be located near a middle (or any other point outside of physical obstruction 316) of AV cable 312 where it may receive IR signals from control device 314. As shown in FIG. 3, an output terminal (e.g., a pin, a pad, a wire) of IR receiver 318 may be coupled to a signal line 322 of AV cable 312 of the plurality of signal lines and/or another terminal of IR receiver 318 may be coupled to a ground line 324 of AV cable 318, described below.

Referring back to FIG. 2, in step 204, information of the IR signal is transmitted on at least one signal line of the AV cable. For example, as shown in FIG. 3, upon receiving IR signal from control device 314, information of the IR signal may be transmitted on signal line 322 of AV cable 314, which is coupled to an input terminal of IR emitter 320. In embodiments, signal line 322 may be an additional or extra signal line incorporated, integrated and/or otherwise combined with AV cable 312. In other embodiments, signal line 322 may be an existing signal line of AV cable 312 to which an output terminal of IR receiver 318 and/or an input terminal of IR emitter 320 may be coupled.

As described herein, signal line 322 may transmit information (e.g., one or more commands) of IR signal to control media device 306. In an example, information transmitted on signal line 322 may be a raw or native IR signal received from control device 314. In other examples, information transmitted on signal line 322 may comprise a signal generated, converted, or otherwise obtained from the received IR signal (e.g., an encoded signal). In embodiments, transmitted information may comprise a digital signal, an analog signal, or any type of electrical pulse corresponding to the received infrared signal suitable for transmission on signal line 322 comprising the commands received by receiver 318 from control device 322.

In step 206, the IR signal is transmitted to a device coupled to the AV cable via an IR emitter. For instance, with referenced to FIG. 3, an input terminal of IR emitter 320 may be coupled to signal line 322, such that IR emitter 320 receives information of the IR signal from control device 314, and transmits the IR signal to IR receiver 310 of media device 306. In embodiments, a terminal of IR emitter 320 may be further coupled to a power line 326 of AV cable 312, such as a power line of an HDMI cable (e.g., pin 18 of an HDMI cable comprising a 5-volt power line). In this manner, IR emitter 320 may be integrated within, and powered by, AV cable 312 without the need for an additional or external power source.

IR emitter 320 may comprise any suitable type of infrared emitter, such as one or more IR light-emitting diodes (LEDs). In embodiments, IR emitter 320 may be located near an end of AV cable 312 proximal to media device 306 (e.g., within physical obstruction 316), such that IR emitter 320 is in a line of sight of IR receiver 310. IR emitter 320 may comprise an emitter located in-line with AV cable 312, or as an extension to an end or side of AV cable 312 (e.g., that may be pointed at or directed towards IR receiver 310). In an embodiment, IR emitter 320 may further comprise additional circuitry (not shown) to convert or decode information transmitted on signal line 322 to an appropriate IR signal format that may be transmitted to IR receiver 310.

Accordingly, using the techniques described herein, an IR signal from control device 314 may be "repeated" using IR receiver 318 and IR emitter 320 integrated in AV cable 312, thereby permitting a user to control media device 306, despite media device 306 being located behind a physical obstruction (e.g., a closet) without sacrificing any of the functionality of control device 314.

In some embodiments, one or more of steps 202, 204, and/or 206 of flowchart 200 may not be performed. Moreover, operations in addition to or in lieu of steps 202, 204, and/or 206 may be performed. Further, in some example embodiments, one or more of operations 202, 204, and/or 206 may be performed out of order, in an alternate sequence, or partially (or completely) concurrently with each other or with other operations.

B. IR Over an AV Cable for Devices with an IR Controller in a Cabinet/Closet

In some embodiments, IR signal converter 118 (FIG. 1) may enable an IR controlled media device located behind a physical obstruction to act as an IR controller for one or more other media devices (e.g., located outside the physical obstruction). For instance, a media device in a closet may be an IR controller (e.g., a home automation console, such as Control4®, or a multimedia switching device) that may transmit IR signals comprising one or more commands for controlling another device. As shown in FIG. 1 depicting home entertainment system 100, physical obstruction 116 prevents control device 114 from transmitting IR signals directly to media device 106, and physical obstruction 116 also prevents media device 106 from directly transmitting any IR signals to another device (e.g., media device 102).

In accordance with techniques described herein, IR signal converter 118 may be configured to enable a device to continue to operate as an IR controller for other devices despite that device being located behind a physical obstruction (e.g., located within a closet). The following subsections describe various exemplary embodiments in which the techniques described herein may be carried out.

1. HDMI Ethernet Audio Control/Audio Return Channel Based Scheme

Figure 4:
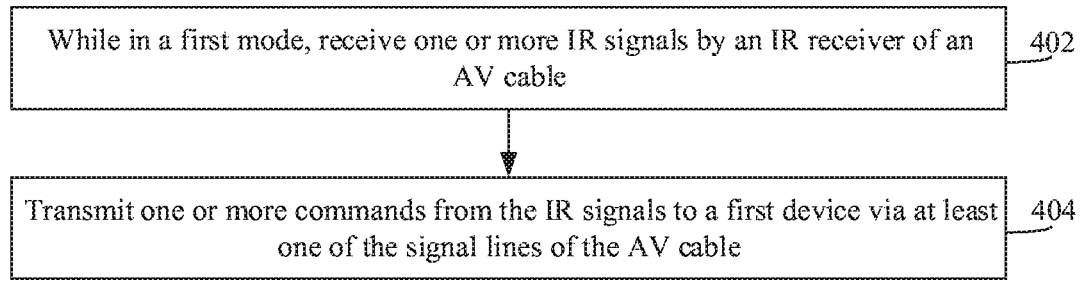
FIG. 4 depicts a flowchart of a method for transmitting an IR command to a device via an AV cable in a first mode in accordance with an embodiment.
Figure 5:
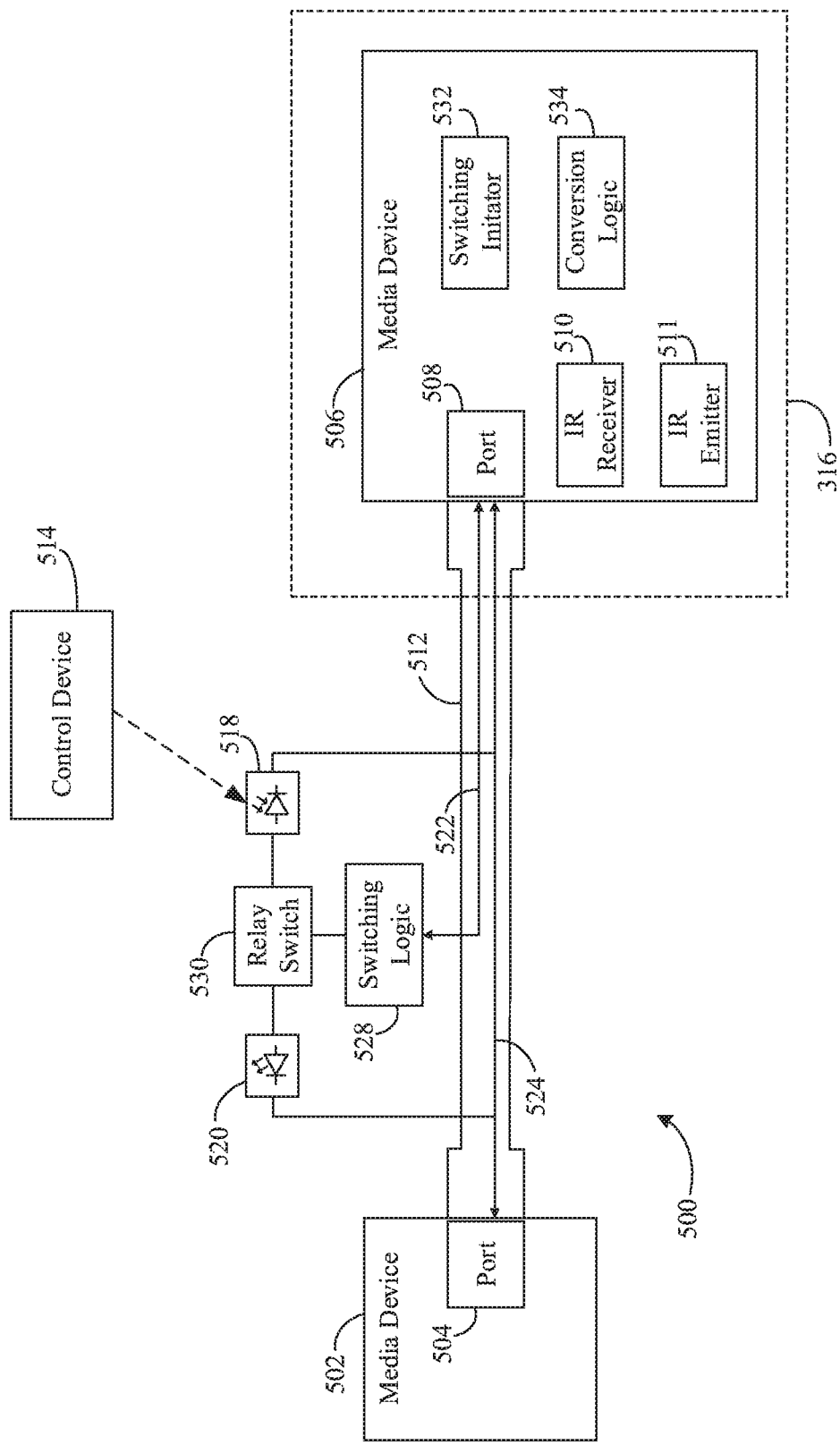
FIG. 5 is a block diagram of a home entertainment system configured to enable the transmission of IR signals to and from a media device located behind a physical obstruction via an AV cable in accordance with an embodiment.

In an embodiment, IR signal converter 118 enables a command contained within IR signals transmitted from a control device to be transmitted over one or more signal lines of an AV cable (e.g., an HDMI cable) as one or more electrical pulses. For example, FIG. 4 shows a flowchart 400 for enabling the transmission of one or more commands from an IR signal to a device via a signal line of the AV cable in a first mode. For purposes of illustration, flowchart 400 of FIG. 4 is described with respect to FIG. 5. FIG. 5 shows a block diagram of a home entertainment system 500 configured to enable the transmission of IR signals to and from a media device located behind a physical obstruction via an AV cable, according to an example embodiment. As shown in FIG. 5, system 500 includes a media device 502, a media device 506, an AV cable 512, and a control device 514. AV cable 514 includes switching logic 528, a relay switch 530, an IR receiver 518, and an IR emitter 520, which comprise an embodiment of IR signal converter 118. AV cable 512 also comprises plurality of audio/video signal lines, an HDMI Ethernet Audio Control (HEAC) or an Audio Return Channel (ARC) signal line 522, and a ground line 524. Media device 502 comprises an AV port 504, and media device 506 comprises an AV port 508, an IR receiver 510, an IR emitter 511, a switching initiator 532, and conversion logic 534. Flowchart 400 and system 500 are described as follows. Further structural and operational embodiments will be apparent to persons skilled in the relevant art(s) based on the following description.

Flowchart 400 begins with step 402. In step 402, while in a first mode, one or more IR signals are received by an IR receiver of an AV cable. For instance, with reference to FIG. 5, control device 514 may transmit one or more IR signals to IR receiver 518. Control device 514 and IR receiver 518 may be examples of control device 314 and IR receiver 318, respectively, described above with respect to FIG. 3. The one or more IR signals may comprise, for example, one or more commands to control media device 506 located behind physical obstruction 316. In embodiments, media device 506 may act as a controller for one or more other media devices, such as an IR controller for media device 502 located outside physical obstruction 316. For instance, media device 506 may transmit IR signals via IR emitter 511 to control one or more other media devices (e.g., media device 502, or any other device capable of receiving an IR signal). In an example, media device 506 may be a home automation console or a multimedia switching device configured to control one or more other devices (e.g., media device 502) via one or more commands to be transmitted as IR signals. Media device 506 may be configured to control media device 502 (e.g., by powering on or switching an input of media device 502) in response to receiving a command from control device 514.

In embodiments, media device 502 may be an example of media device 302 described above with reference to FIG. 3 (e.g., a TV, an HDTV, a projector, a monitor, etc.) or any other home entertainment or home automation device that may be controlled via an IR signal. As illustrated in FIG. 5, port 504 of media device 502 and port 508 of media device 506 may be coupled via an AV cable 512. In an embodiment, ports 502 and 506 may be HDMI ports, and AV cable 512 may be an HDMI cable comprising a plurality of signal lines, one or more of the which are configured to carry an audio or video signal from one media device (e.g., media device 506) to another media device (e.g., media device 502). Furthermore, at least one of the signal lines of the plurality of signal lines of AV cable 512 may comprise signal line 522 for carrying other data used in conjunction with the transmitted audio and/or video signals.

As described above, AV cable 514 (e.g., HDMI cable) includes switching logic 528, relay switch 530, IR receiver 518, and IR emitter 520 integral with AV cable 514. One or more of these components may be located in-line with AV cable 514 or as one or more extensions to an end or a side of AV cable 514. As will be described below, relay switch 530 may be coupled to switching logic 528, an output terminal from IR receiver 518, and an input terminal to IR emitter 520 to enable the switching between a first operating mode that activates IR receiver 518, and a second operating mode that activates IR emitter 520. In an embodiment, IR receiver 518 and/or IR emitter 520 may be located near an end of AV cable 514 (e.g., proximal to media device 502) outside of physical obstruction 316, such that IR receiver 518 may easily receive IR signals from control device 514 and IR emitter may easily transmit IR signals to media device 502. As shown in FIG. 5, terminals of IR receiver 518 and IR emitter 520 may further be coupled to a ground line 524 of AV cable 512.

In step 404, the one or more commands from the received IR signals are transmitted to a device via at least one of the signal lines of the AV cable (e.g., as one or more electrical pulses corresponding to the received IR signals). For instance, with reference to FIG. 5, the one or more commands from the IR signals received by receiver 518 are transmitted via an output terminal of receiver 518 coupled to signal line 522 via relay switching logic 528 and relay switch 530 when relay switch 530 is in a first mode, described in greater detail below. In embodiments, relay switch 530 is in a first mode during normal operation (e.g., by default), causing an output of receiver 518 to be coupled to signal line 522 during normal operation.

As shown in FIG. 5, signal line 522 may be, or may be coupled to an HEAC/ARC signal line. For instance, where AV cable 512 is an HDMI cable, HEAC/ARC signals may be carried on a certain pin (e.g., pin 14 of the HDMI cable) configured to carry optional signals for HDMI functionality. Accordingly, while in a first mode, signal line 522 corresponding to pin 14 (e.g., ARC/HEAC signal line(s)) may be coupled to an output of receiver 518 via switching logic 528 and relay switch 530. As shown in FIG. 5, because signal line 522 is configured to carry optional signals for HDMI functionality, signal line 522 may be intercepted by switching logic 528 to enable the transmission of IR-based commands in accordance with techniques described herein. However, signal line 522 need not be intercepted as shown in FIG. 5, but may also be spliced or tapped in other embodiments. In the above manner, one or more IR-based commands received by receiver 518 may be transmitted on an existing signal line of AV cable to another media device (e.g., media device 506 as shown in FIG. 5).

In embodiments, the one or more commands transmitted on signal line 522 may be received by media device 506 in various ways. For instance, AV cable 512 may comprise an additional switching logic, relay switch, IR emitter, and/or IR receiver at an end/connector inside of physical obstruction 316 as described herein that may further enable the receiving and/or emission of IR signals from/to media device 506. In such an example, the additional IR emitter (not shown) on AV cable 512 inside physical obstruction 316 may transmit the one or more commands received via HEAC/ARC signal line 522 as IR signals to IR receiver 510 of media device 506 (e.g., in a similar manner as described above with respect to receiving IR signals via IR receiver 310). If the one or more commands transmitted on signal line 522 comprise raw or native IR signals, such signals may be provided to the additional IR emitter for transmission to media device 506. If, in another example, the commands are transmitted on signal line 522 as signals generated, converted, or otherwise obtained from the received IR signal (e.g., electrical pulses corresponding to a received IR signal), the IR emitter located within physical obstruction 316 may contain additional circuitry to transmit and/or convert the signals into an appropriate IR signal format that may be received by media device 506 (e.g., by encoding and/or decoding the commands received in signal line 522).

In another embodiment, the one or more commands transmitted on signal line 522 may be received directly by media device 506 via port 508, as shown in FIG. 5. In such an embodiment, media device 506 may comprise conversion logic 534 configured to convert the one or more commands (e.g., IR-based commands) transmitted on signal line 522 (e.g., HEAC/ARC signal line) and received via port 508 to one or more operation commands to be applied to media device 506. For instance, conversion logic 534 may incorporate a look-up table, or the like, configured to convert a received command to a format that may be understood by media device 506. For example, if a command received on HEAC/ARC signal line 522 comprised a command to switch an input of media device 506 that was generated from an IR signal of control device 514, conversion logic 534 may be configured to decode the received IR-based command into a format that may be applied to media device 506.

In some embodiments, one of steps 402 and/or 404 of flowchart 400 may not be performed. Moreover, operations in addition to or in lieu of steps 402 and/or 404 may be performed. Further, in some embodiments, steps 402 and 404 may be performed out of order, or partially (or completely) concurrently with each other or with other operations.

Figure 6:
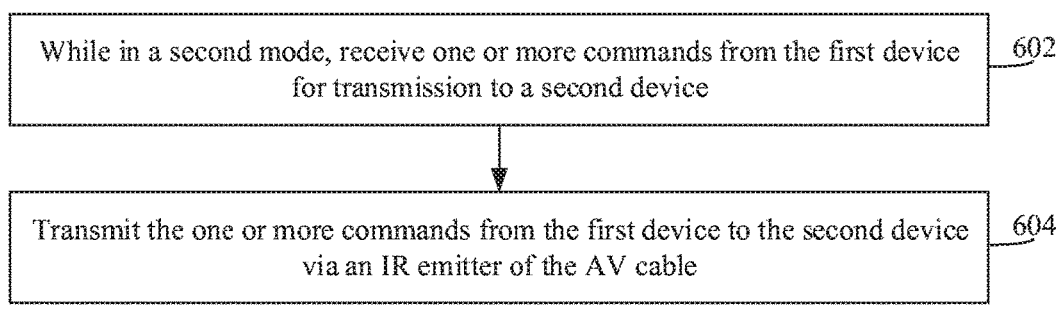
FIG. 6 depicts a flowchart of a method for transmitting an IR command from a device via an AV cable in a second mode in accordance with an embodiment.

In embodiments, media device 506 may be configured to transmit one or more commands to another device via an IR signal in a second mode in response to an operation of control device 514. For example, FIG. 6 shows a flowchart 600 for enabling the transmission of one or more commands from a first device (e.g., a media device acting as an IR controller) to a second device (e.g., a controlled device) via an IR emitter integrated in an AV cable. For purposes of illustration, flowchart 600 of FIG. 6 is described with continued reference to FIG. 5. Flowchart 600 is described as follows. Further structural and operational embodiments will be apparent to persons skilled in the relevant art(s) based on the following description.

Flowchart 600 begins with step 602. In step 602, while in a second mode, one or more commands from a first device are received for transmission to a second device. For instance, with reference to FIG. 5, an input terminal of IR emitter 520 may receive one or more commands from media device 506 via HEAC/ARC signal line 522 while in a second mode. As an illustrative example, where media device 506 is an IR controller, media device 506 may determine to transmit one or more control commands to another coupled device (e.g., media device 502 as shown in FIG. 5) via an IR signal. For example, if a user operates control device 514 to power on media device 506 in a manner as described above, media device 506 may determine that an IR signal should also be transmitted to another media device (e.g., to power on media device 502). Even though media device 506 is located behind a physical obstruction, AV cable 514 may be utilized to carry out the transmission of the IR signals in accordance with the techniques described herein to control media device 502 by transmitting the one or more IR-based commands on HEAC/ARC signal line 522 from media device 506 to an input terminal of an IR emitter coupled to signal line 522 directed at media device 502.

In an embodiment, AV cable 512 may further comprise an additional IR receiver located within physical obstruction 316 configured to receive an IR signal from IR emitter 511 of media device 506. In such an example, the additional IR receiver on the AV cable located within physical obstruction 316 may be coupled to signal line 522 via appropriate logic/circuitry such that the IR-based commands received by the additional IR receiver may be transmitted on HEAC/ARC signal line 522 for transmission to IR emitter 520 and media device 502.

In another example, AV cable 512 need not contain an additional IR receiver located within obstruction 316. For example, in a similar manner as described above, conversion logic 534 may convert one or more IR-based commands determined to be transmitted by media device 506 for transmission directly on signal line 522 via port 508. For instance, conversion logic may implement a look-up table or the like to convert an IR-based command to a format that may be transmitted via signal line 522. In this manner, the one or more IR-based commands may be transmitted to IR emitter 520 via signal line in a second mode without the use of an additional IR receiver. It is noted that although it is described herein that conversion logic may be implemented in media device 506, AV cable 512 (e.g. in any one of switching logic 528, relay switch 530, and/or IR emitter 520) may similarly implement the switching logic described herein.

In step 604, the one or more commands from the first device are transmitted to the second device via an IR emitter of the AV cable. For example, with reference to FIG. 5, while in a second mode, IR emitter 520 integral to AV cable 512 may transmit an IR signal comprising the one or more IR-based commands to media device 502. IR emitter 520 may comprise any suitable type of infrared emitter, such as one or more IR LEDs. As described above, depending on the manner and format by which HEAC/ARC signal line 522 carries the IR-based commands, IR emitter 520 may further comprise additional logic/circuitry to convert the commands to an appropriate format such that the IR signals emitted by IR emitter 520 are received by a receiver of media device 502.

In some embodiments, one of steps 502 and/or 504 of flowchart 500 may not be performed. Moreover, operations in addition to or in lieu of steps 502 and/or 504 may be performed. Further, in some embodiments, steps 502 and 504 may be performed out of order, or partially (or completely) concurrently with each other or with other operations.

Figure 7:
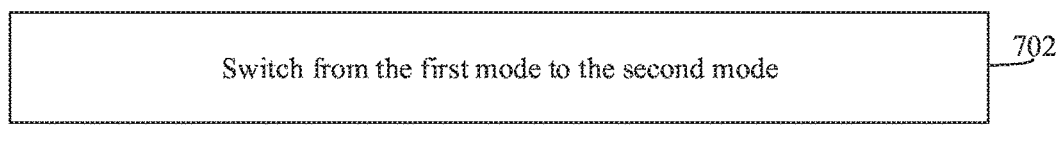
FIG. 7 depicts a flowchart of a method for switching an AV cable between IR receiving and IR emitting modes in accordance with an embodiment.

In accordance with embodiments, an AV cable may switch between a first mode in which an IR receiver integral to the AV cable is enabled and a second mode in which an IR emitter integral to the cable is enabled. For example, FIG. 7 depicts a flowchart 700 of a method for switching an AV cable between IR receiving and IR emitting modes in accordance with an embodiment. For purposes of illustration, flowchart 700 of FIG. 7 is described with continued reference to FIG. 5. Flowchart 700 is described as follows. Further structural and operational embodiments will be apparent to persons skilled in the relevant art(s) based on the following description.

Flowchart 700 begins with step 702. In step 702, an operating mode may be switched from a first mode to a second mode. For instance, with reference to FIG. 5, switching initiator 532 of media device 506 may transmit one or more signals to switching logic 528 via signal line 522 (or any other signal line) that causes relay switch 530 to switch positions from a first mode (e.g., a mode in which an output terminal of IR receiver 518 is coupled to signal line 522) to a second mode (e.g., a mode in which an input terminal to IR emitter 520 is coupled to signal line 522). In embodiments, the first mode is enabled by default (e.g., during normal operation).

An operating mode of AV cable may be switched from a first mode to a second mode in a variety of ways. In accordance with an embodiment, in order to switch from a first mode to a second mode, switching initiator 532 may transmit a frequency signal on signal line 522 (i.e., the same HEAC/ARC signal line used to transmit the IR-based commands as discussed above) that is outside of the range of IR protocol frequencies. For instance, switching initiator 532 may transmit a clock pulse to be received by switching logic 528 via signal line 522 at a frequency (e.g., a 10 Hz clock pulse or signal) that does not interfere or overlap with the range of IR protocol frequencies that may be utilized during transmission of an IR-based command. In response to receiving the clock pulse or signal, switching logic 528 may automatically cause relay switch 530 to activate, enabling the second operating mode in which an input of IR emitter 520 is coupled to signal line 522. In an embodiment, switching logic 528 may activate relay switch 530 for a temporary duration (e.g., a predetermined period of time) in response to receiving the clock pulse or signal on signal line 522.

As an illustrative example, suppose that media device 506 determines that another coupled device (e.g., media device 502) should be controlled via an IR signal in response to receiving a signal from control device 514 in a first mode. Switching initiator 532 may transmit a 10 Hz (or other low frequency) pulse to switching logic 528 via signal line 522, thereby causing relay switch 530 to be activated for a temporary duration (e.g., 150 milliseconds) in a second mode. In this manner, an output of IR receiver 518 is decoupled from signal line 522, and an input of IR emitter 520 is instead coupled to signal line 522 for the temporary duration. Following transmission of the clock pulse by switching initiator 532 enabling the second mode, one or more IR-based commands (e.g., an IR pulse that is 100 milliseconds long) may be transmitted from media device 506 to media device 502 via IR emitter 520, as discussed above (e.g., in accordance with flowchart 600).

In accordance with embodiments, the temporary duration (e.g., 150 milliseconds) for the second mode is longer than the maximum time needed to transmit the IR commands (e.g., 100 milliseconds) via signal line 522. Upon passage of the temporary duration, relay switch 530 automatically returns to its normal (i.e., default) state, thereby placing AV cable 512 in the first mode in which IR receiver 518 is enabled. In an embodiment, the temporary duration may be implemented via an appropriately-sized capacitor (not shown) in switching logic 528 and/or relay switch 530 that may be charged based on the clock pulse transmitted by switching initiator 532. For instance, upon receiving the clock pulse and charging the capacitor, relay switch 530 may switch from a first position to a second position, and automatically revert back to the first position at a time when the capacitor becomes discharged.

Switching logic 528 may be configured to cause relay switch 530 to switch from a first mode to a second mode in other ways, such as by implementing current sensing circuitry. In accordance with an embodiment, switching initiator 532 may be configured to send an extended pulse comprising a logic "high" via signal line 522. Switching logic 528 may thereby detect the extended pulse, and as a result, sense a different level of current being transmitted on signal line 522 (e.g., a current level different from or exceeding a threshold current level on signal line 522 during operation of the AV cable in a first mode). In embodiments, current sensing may be done in a number of ways, including without limitation using a Hall effect sensor, a current transformer, a current sense resistor using an operational amplifier (OP/AMP), or any other manner appreciated by one skilled in the relevant art. In response to detecting the different current level, switching logic 528 may cause relay switch 530 to switch positions for the temporary duration as described herein.

In another embodiment, switching logic 528 may cause relay to switch operating modes based on voltage sensing circuitry. For instance, switching initiator 532 may similarly transmit an extended pulse, as described previously. However, in a voltage sensing embodiment, switching logic 528 may activate relay switch 530 upon sensing a voltage generated across one or more resistors (not shown) arranged in series with IR receiver 518 and IR emitter 520 of AV cable 512. In another embodiment, switching logic may detect a voltage drop across the one or more resistors. Voltage sensing techniques are not, however, limited to the methods described herein, but may include any other manner of sensing or detecting a voltage on signal line 522.

In accordance with yet another embodiment, switching logic 528 may comprise a microcontroller (e.g., a low-powered microcontroller). For example, switching initiator 532 may transmit a signal on signal line 522 to be received by the microcontroller indicating that a position of relay switch 530 should be switched. Upon receipt of the signal, switching logic 528 may automatically cause relay switch 530 to switch from a first mode to a second mode. In accordance with this exemplary embodiment, the microcontroller described herein may be configured to communicate with switching initiator 532 using a one-wire communication protocol (e.g., a communication protocol that may be implemented using a single signal line, such as signal line 522). As described in greater detail below, a microcontroller may also be utilized in conjunction with other embodiments and/or communication protocols.

In accordance with the foregoing techniques, AV cable 512 normally remains in the IR receiver mode (the first mode), and is switched to an IR emitter mode (the second mode) for the temporary duration only when media device 506 determines that media device 502 should be controlled via IR-based commands, and automatically reverts back to the first mode upon transmission of the IR-based commands.

2. Display Data Channel Based Scheme Using a Microcontroller

Figure 8:
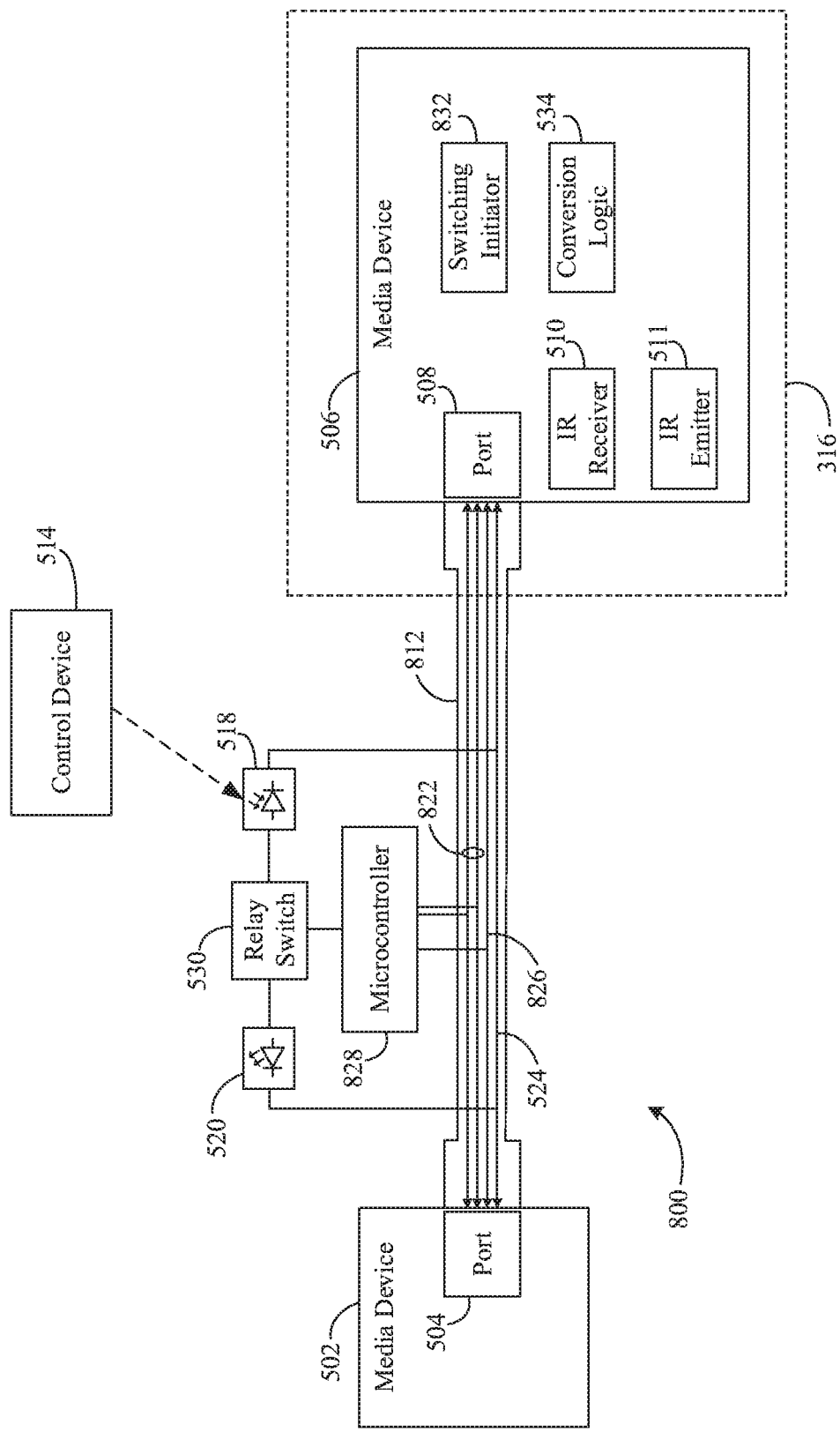
FIG. 8 is a block diagram of another home entertainment system configured to enable the transmission of IR signals to and from a media device located behind a physical obstruction via an AV cable in accordance with an embodiment.

In another embodiment, IR signal converter 118 may be implemented using other signal lines of an AV cable, such as Display Data Channel (DDC) signal lines of an HDMI cable, to enable a IR-based commands to be transmitted from a control device. For example, FIG. 8 shows a block diagram of another home entertainment system 800 configured to enable the transmission of IR signals to and from a media device located behind a physical obstruction via DDC signal lines of an AV cable, according to an example embodiment. As shown in FIG. 8, system 800 includes control device 514, media device 502, media device 506, and an AV cable 812 coupling media devices 502 and 506. Media device 502 comprises an AV port 504, and media device 506 comprises an AV port 508, an IR receiver 510, an IR emitter 511, a switching initiator 832, and conversion logic 534. In an embodiment, AV cable 812 may comprise an HDMI cable. As illustrated in FIG. 8, AV cable 812 may comprise a plurality of audio/video signal lines and DDC signal lines 822, a microcontroller 828, IR receiver 518, IR emitter 520, and relay switch 530. In embodiments, microcontroller 828 may further be coupled to a power line 826 of AV cable 812. Microcontroller 828, relay switch 530, IR receiver 518, and IR emitter 520 comprise an embodiment of IR signal converter 118.

In accordance with an embodiment, microcontroller 828 may be coupled to, or otherwise tapped into, DDC signal lines 822 of AV cable 812. DDC signal lines 822 are Inter-Integrated Circuit (I2C) lines that enable microcontroller 828 to communicate with HDMI-coupled devices in accordance with an HDMI communication protocol. In embodiments, DDC lines are configured to control signal lines configured to carry control information between two HDMI-coupled devices (e.g., handshake information, encryption keys, etc.). For instance, using signals transmitted on DDR signal lines 822, media device 502 and media device 506 may communicate with microcontroller 828 to send and/or receive IR signals using techniques described herein.

With reference to FIG. 8, microcontroller 828 is configured to receive IR signals comprising one or more commands from control device 514 via IR receiver 518, and transmit the one or more commands to media device 506 over the DDC signal lines 822 in a first mode. As described earlier, media device 506 may determine that it should control media device 502 via an IR-based command in response to operation of control device 514. In this instance, switching initiator 832 of media device 506 may transmit one or more signals to microcontroller 828 over DDC signal lines 822 (e.g., using DDC signaling protocols). In response to receiving the signals over DDC signal lines 822, microcontroller causes relay switch 530 to switch from a first mode (an IR receiver mode) to a second mode (an IR emitter mode) in which media device 506 may transmit the desired commands as data signals over DDC signal lines 822 to IR emitter 520.

Although it is described herein that switching initiator 832 may transmit signals to microcontroller 828 to activate relay switch 530, additional signals may be transmitted over DDC signal lines to microcontroller 828 to further enhance the functionality of the techniques described. For instance, when switching from a first mode to a second mode, switching initiator 832 may also be configured to identify a length of time to activate relay switch 530 (e.g., to activate relay switch for duration of 300 milliseconds if a plurality of IR-based commands is to be transmitted to media device 502). In another embodiment, switching initiator 832 may also be configured to transmit a signal to microcontroller to entirely disable one or both of the first and second operating modes discussed herein altogether. Accordingly, utilization of microcontroller 828 may thereby increase the flexibility and functionality of the techniques described.

Given that data communications between microcontroller 828 and media device 506 take place by coupling or tapping into DDC signal lines 822 of AV cable 812, such communications (including the transmission of IR-based commands) may be conducted in accordance with DDC signaling protocols. In an example, IR signals received by IR receiver 518 comprising one or more commands for media device 506 may be converted (e.g., by microcontroller 828) into data signals or electrical pulses (e.g., codes) comprising the one or more received IR-based commands for transmission on DDC signal lines 822 in accordance with an appropriate signaling protocol, as opposed to transmitting raw or native IR signals discussed earlier. For instance, microcontroller 828 may contain conversion logic (not shown) similar to conversion logic 534 configured to convert a raw or native IR signal received by IR receiver 518 into a code that may be transmitted on DDC signal lines 822 utilizing DDC signaling protocols. In embodiments, microcontroller 828 may further comprise a look-up table, or the like, as described above with reference to FIG. 3, for converting between raw IR signals and codes that may be transmitted along DDC signal lines 822. In another embodiment, microcontroller 828 may access a look-up table via a coupled device (e.g., a look-up table on media device 506) by communication over one or more signal lines.

In a similar manner, when switching initiator 832 transmits a signal via DDC signal lines 822 to microcontroller 828 to cause it to switch a position of relay switch 530 enabling a second operating mode (e.g., an IR emitter mode), media device 506 may utilize conversion logic 534 to convert an IR signal comprising one or more IR-based commands to be applied to media device 502 into one or more codes that may be transmitted to microcontroller 828 via DDC signal lines 822 in accordance with the appropriate signaling protocols. Upon receipt of the one or more codes, microcontroller 828 may use a similar conversion logic (or alternatively obtain information from conversion logic 534 via DDC signal lines 822) to convert the received codes into raw IR signals that may be emitted by IR emitter 520 in the second operating mode. For example, if media device 506 determines that an IR signal is to be transmitted to power on media device 502, conversion logic 534 may convert the power-on command to a corresponding code that is transmitted on DDC signal lines 822. Microcontroller 828 may reference a look-up table or the like to convert the power-on code to an IR signal comprising a power-on command for the particular media device brand, make, or model, which may then be emitted by IR emitter 520 for a period of time (e.g., 100 milliseconds) to power on media device 502.

3. Consumer Electronics Control Based Scheme Using a Microcontroller

Figure 9:
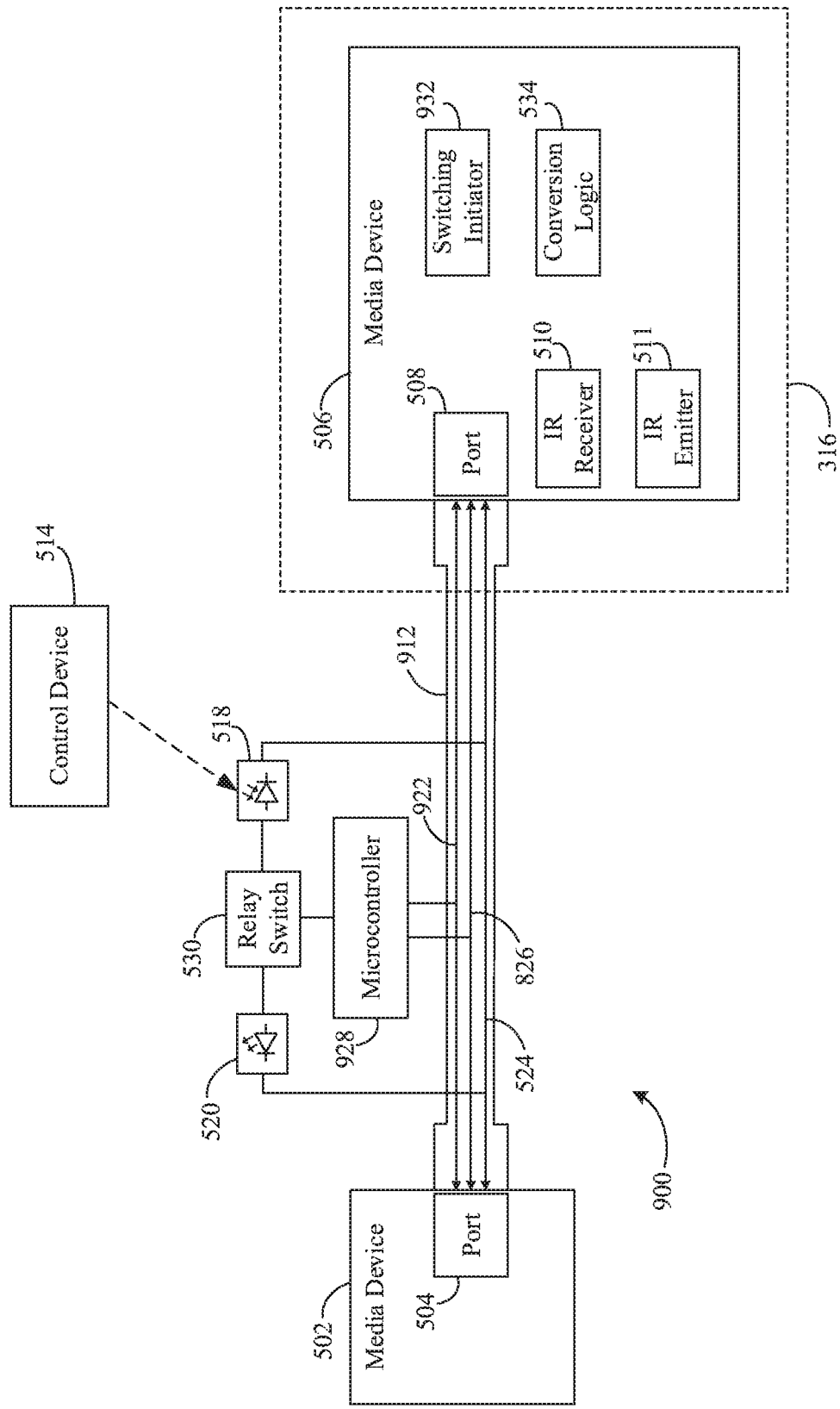
FIG. 9 is a block diagram of another home entertainment system configured to enable the transmission of IR commands to and from a media device located behind a physical obstruction via an AV cable in accordance with an embodiment.

In accordance with another embodiment, IR signal converter 118 may enable the transmission of IR-based commands over an AV cable using other signal lines, such as a Consumer Electronics Control (CEC) signal line in a similar manner as described above with respect to DDC-based signaling. FIG. 9 shows a block diagram of a home entertainment system 900 configured to enable the transmission of IR commands to and from a media device located behind a physical obstruction via a CEC signal line of an AV cable, according to an example embodiment. As shown in FIG. 9, system 900 includes control device 514, media device 502, media device 506, and an AV cable 912 coupling media devices 502 and 506. Media device 502 comprises an AV port 504, and media device 506 comprises an AV port 508, an IR receiver 510, an IR emitter 511, a switching initiator 932, and conversion logic 534. In an embodiment, AV cable 912 may comprise an HDMI cable. As illustrated in FIG. 9, AV cable 912 may comprise a plurality of audio/video signal lines, a CEC signal line 922, a microcontroller 928, IR receiver 518, IR emitter 520, and relay switch 530. Microcontroller 928, relay switch 530, IR receiver 518, and IR emitter 520 comprise an embodiment of IR signal converter 118. In embodiments, microcontroller 928 may further be coupled to a power line 826 and a ground line 524 of AV cable 912, in a similar manner as described previously.

In the example embodiment illustrated in FIG. 9, CEC signal line 922 comprises a signal line of an HDMI cable used for transmitting one or more CEC commands between media device 506 and media device 502 in accordance with the CEC communication protocol. By coupling microcontroller 928 to CEC signal line 922 in a similar manner as describe above with respect to FIG. 8, IR signals received by IR receiver 518 may be transmitted as codes via CEC signal line 922 in a first mode to media device 506. Furthermore, in a similar manner, switching initiator 932 may transmit a signal, via CEC signal line 922, to cause microcontroller 928 to switch a position of relay switch 530 between a first mode and a second mode. In the second mode, IR-based commands may be transmitted from media device 506 as codes (e.g., electrical pulses corresponding to an IR signal) via CEC signal line 922 to IR emitter 520, via microcontroller 928, for transmission as IR signals to media device 502 in accordance with the above techniques.

Furthermore, in a similar manner as described above, media device 506 and/or microcontroller 928 may comprise conversion logic comprising vendor specific CEC commands and/or IR data (e.g., a look-up table or the like for converting between codes transmitted on CEC signal line 922 and one or more IR signals corresponding to the codes based on a particular media device).

C. IR-Based Transmission to a Non-IR Device

As described above, techniques disclosed herein may be utilized to transmit a signal from IR control device 514 to a media device over a signal line of an AV cable. Although certain embodiments disclosed above are described with reference to media device 506 as a hub or a multimedia switching device which may be configured as an IR controller, the IR signal converter 118 (FIG. 1) may also enable the control of non-IR capable devices using IR-based signals (e.g., to a device without IR receiver 510 or IR emitter 511). For instance, with reference to FIGS. 5, 8, and 9, media device 506 may comprise a media device (e.g., a home entertainment device, such as a gaming console) that is not configured to receive and/or transmit any IR signals. In such an embodiment, media device 506 may nevertheless be configured to receive commands from an IR-based remote control device 514.

For instance, as described above, media device 506, via conversion logic 534, may implement a look-up table correlating IR commands received by IR receiver 518 (e.g., signals from control device 514) to codes transmitted on signal lines as described above. For example, the look-up table may correlate a certain command from control device 514 (e.g., a universal IR-based remote control) corresponding to a code transmitted a signal line (e.g., a CEC signal line) with an action to be carried out on media device 506. In embodiments, conversion logic 534 may be implemented as software residing on media device 506 (e.g., as an installed application) that has the ability to analyze data on a lower-level hardware layer (e.g., data contained within an HDMI frame received via port 508).

In an example, when IR receiver 518 receives an IR signal from control device 514, the received IR signal may be converted in accordance with the above techniques to a code, and the code may be received by port 508 via any of the above-described signal lines. By analyzing data received via port 508 (e.g., data contained within an HDMI frame received on an HDMI port), conversion logic 534 may convert the code received via the appropriate signal line to a corresponding action based on the look-up table, thereby enabling non-IR media device 506 to be controlled via an IR signal from control device 514. Accordingly, in this manner, any device (both IR and non-IR capable devices) that is capable of receiving data via an AV signal line may utilize the techniques described herein to receive and respond to IR-based remote control commands.

D. AV Cable Extension Embodiments

In accordance with the embodiments described above, any one or more of IR signal converter 118, IR receiver 318, IR receiver 320, IR receiver 518, IR emitter 520, switching logic 528, relay switch 530, microcontroller 828, and/or microcontroller 928 (or any combination thereof) may be integrated in an AV cable as illustrated herein, or may be implemented as one or more cable adapters, cable extensions, or the like connectable to an existing AV cable. For instance, the any one or more of the above elements may be implemented as an adapter or extension, or the like, that may be coupled to a connector at one end (or both ends) of another AV cable. In this manner, because one or more of the components described herein may be connected to one or both ends of an existing AV cable as cable extensions (e.g., an HDMI cable extension implementing the technique(s) described herein (e.g., IR signal converter 118, or any of the embodiments, components, or subcomponents described herein), the HDMI cable extension including first and second connectors connected by a wire bundle, and an IR signal converter embodiment), the benefits and advantages described above may be attained without having to replace an existing AV cable coupling two media devices (such as an HDMI cable that may be travelling through a finished wall).

Further Example Embodiments

A device, as defined herein, is a machine or manufacture as defined by 35 U.S.C. § 101. Devices may be digital, analog or a combination thereof. Devices may include integrated circuits (ICs), one or more processors (e.g., central processing units (CPUs), microprocessors, digital signal processors (DSPs), etc.) and/or may be implemented with any semiconductor technology, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

Techniques and embodiments, including methods, described herein may be implemented in hardware (digital and/or analog) or a combination of hardware and software and/or firmware. Techniques described herein may be implemented in one or more components. Embodiments may comprise computer program products comprising logic (e.g., in the form of program code or instructions as well as firmware) stored on any computer useable storage medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable storage media include, but are not limited to, a hard disk, a removable magnetic disk, a removable optical disk, flash memory cards, digital video disks, random access memories (RAMs), read only memories (ROM), and the like. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (microelectromechanical systems) storage, nanotechnology-based storage devices, as well as other media such as flash memory cards, digital video discs, RAM devices, ROM devices, and the like. Such computer-readable storage media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Computer readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wired media as well as wireless media such as acoustic, RF, IR and other wireless media. Example embodiments are also directed to such communication media.

The IR transmission over AV cable embodiments and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

Figure 10:
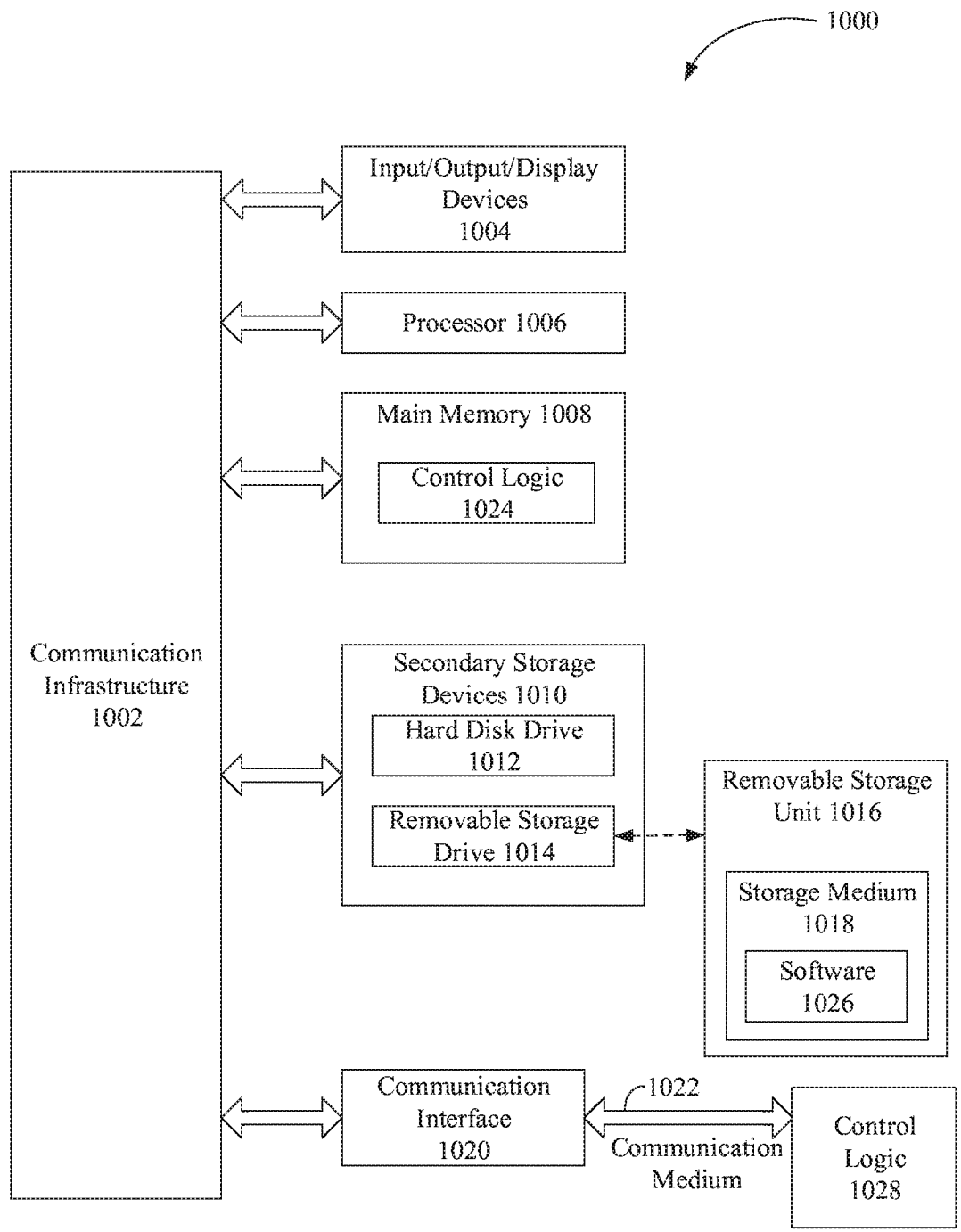
FIG. 10 is a block diagram of a computer system in accordance with an embodiment.

The embodiments described herein, including systems, methods/processes, and/or apparatuses, may be implemented using well known processing devices, telephones (smart phones and/or mobile phones), servers, electronic devices (e.g., consumer electronic devices) and/or, computers, such as a computer 1000 shown in FIG. 10. It should be noted that computer 1000 may represent communication devices, processing devices, servers, and/or traditional computers in one or more embodiments. For example, IR signal converter, media device 302, media device 306, control device 314, media device 502, media device 506, control device 514, switching logic 528, microcontroller 828, and microcontroller 928 (as described above in reference to FIGS. 1, 3, 5, 8, and 9), or any of the sub-systems, components or sub-components respectively contained therein, may be implemented using one or more computers 1000.

Computer 1000 can be any commercially available and well-known communication device, processing device, and/or computer capable of performing the functions described herein, such as devices/computers available from International Business Machines®, Apple®, Sun®, HP®, Dell®, Cray®, Samsung®, Nokia®, etc. Computer 1000 may be any type of computer, including a desktop computer, a server, etc.

Computer 1000 includes one or more processors (also called central processing units, or CPUs), such as a processor 1006. Processor 1006 is connected to a communication infrastructure 1002, such as a communication bus. In some embodiments, processor 1006 can simultaneously operate multiple computing threads.

Computer 1000 also includes a primary or main memory 1008, such as random access memory (RAM). Main memory 1008 has stored therein control logic 1024 (computer software), and data.

Computer 1000 also includes one or more secondary storage devices 1010. Secondary storage devices 1010 include, for example, a hard disk drive 1012 and/or a removable storage device or drive 1014, as well as other types of storage devices, such as memory cards and memory sticks. For instance, computer 1000 may include an industry standard interface, such a USB interface for interfacing with devices such as a memory stick. Removable storage drive 1014 represents a floppy disk drive, a magnetic tape drive, a compact disk drive, an optical storage device, tape backup, etc.

Removable storage drive 1014 interacts with a removable storage unit 1016. Removable storage unit 1016 includes a computer useable or readable storage medium 1018 having stored therein computer software 1026 (control logic) and/or data. Removable storage unit 1016 represents a floppy disk, magnetic tape, compact disk, DVD, optical storage disk, or any other computer data storage device. Removable storage drive 1014 reads from and/or writes to removable storage unit 1016 in a well-known manner.

Computer 1000 also includes input/output/display devices 1004, such as touchscreens, LED and LCD displays, monitors, keyboards, pointing devices, etc.

Computer 1000 further includes a communication or network interface 1020. Communication interface 1020 enables computer 1000 to communicate with remote devices. For example, communication interface 1020 allows computer 1000 to communicate over communication networks or mediums 1022 (representing a form of a computer useable or readable medium), such as LANs, WANs, the Internet, etc. Network interface 1020 may interface with remote sites or networks via wired or wireless connections.

Control logic 1028 may be transmitted to and from computer 1000 via the communication medium 1022.

Any apparatus or manufacture comprising a computer useable or readable medium having control logic (software) stored therein is referred to herein as a computer program product or program storage device. This includes, but is not limited to, computer 1000, main memory 1008, secondary storage devices 1010, and removable storage unit 1016. Such computer program products, having control logic stored therein that, when executed by one or more data processing devices, cause such data processing devices to operate as described herein, represent embodiments of the present subject matter.

Any apparatus or manufacture comprising a computer useable or readable medium having control logic (software) stored therein is referred to herein as a computer program product or program storage device. This includes, but is not limited to, a computer, computer main memory, secondary storage devices, and removable storage units. Such computer program products, having control logic stored therein that, when executed by one or more data processing devices, cause such data processing devices to operate as described herein, represent embodiments of the inventive techniques described herein.

CONCLUSION

While various embodiments have been described above, it should be understood that they have been presented by way of example only, and not limitation. It will be apparent to persons skilled in the relevant art(s) that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A High-Definition Multimedia Interface (HDMI) cable, comprising:
   a plurality of signal lines, one or more of the plurality of signal lines being configured to carry an audio or video signal;
   logic coupled to at least one signal line of the plurality of signal lines, wherein the at least one signal line is at least one of an HDMI Ethernet Audio Control (HEAC) signal line, an Audio Return Channel (ARC) signal line, a Display Data Channel (DDC) signal line, or a Consumer Electronics Control (CEC) signal line, the logic being configured to:
  convert an infrared signal received from an infrared receiving device of the HDMI cable to one or more electrical pulses; and
  transmit the one or more electrical pulses over the at least one signal line.

2. The HDMI cable of claim 1, wherein the HDMI cable is an adapter that may be coupled to a connector of another HDMI cable.

3. The HDMI cable of claim 1, further comprising:
a relay switch coupled to the logic, the logic being further configured to cause the relay switch to enable one of a plurality of operating modes of the HDMI cable.

4. An audio/video (AV) cable, comprising:
a plurality of signal lines, one or more of the plurality of signal lines being configured to carry an audio or video signal;
an infrared (IR) receiver of the AV cable configured to receive one or more IR signals from a remote control device, the one or more received IR signals comprising one or more commands for transmission to a first device via an output terminal coupled to at least one signal line of the plurality of signal lines; and
logic coupled to the at least one signal line, the logic being configured to cause the one or more commands to be transmitted to the first device over the at least one signal line.

5. The AV cable of claim 4, further comprising:
an IR emitter configured to transmit one or more commands received from the first device over the at least one signal line to a second device;
a relay switch coupled to the logic, an input terminal to the IR emitter, and an output terminal from the IR receiver, and
wherein the logic is further configured to cause the relay switch to enable an operating mode of either the IR emitter or the IR receiver.

6. The AV cable of claim 5, wherein the logic is further configured to cause the relay switch to enable the operating mode of the IR emitter in response to the logic receiving a pulse from the first device on the at least one signal line.

7. The AV cable of claim 5, wherein the logic is further configured to cause the relay switch to enable the operating mode of the IR emitter in response to the logic sensing a current on the at least one signal line.

8. The AV cable of claim 5, wherein the logic is further configured to cause the relay switch to enable the operating mode of the IR emitter in response to the logic sensing a voltage on the at least one signal line.

9. The AV cable of claim 5, wherein the logic is further configured to cause the relay switch to enable the operating mode of the IR emitter for a temporary duration.

10. The AV cable of claim 5, where in the logic comprises a microcontroller.

11. The AV cable of claim 4, wherein the AV cable is a High-Definition Multimedia Interface (HDMI) cable.

12. The AV cable of claim 4, wherein the at least one signal line is at least one of an HDMI Ethernet Audio Control (HEAC) signal line, an Audio Return Channel (ARC) signal line, a Display Data Channel (DDC) signal line, or a Consumer Electronics Control (CEC) signal line.

13. A method, comprising:
while in a first mode:
  receiving one or more IR signals by an IR receiver of an audio/video (AV) cable, the IR signals comprising one or more commands from a remote control device and the AV cable comprising a plurality of signal lines, one or more of the plurality of signal lines being configured to carry an audio or video signal; and
  transmitting the one or more commands to a first device over at least one signal line of the plurality of signal lines of the AV cable.

14. The method of claim 13, further comprising:
while in a second mode:
  receiving one or more commands from the first device for transmission to a second device over the at least one signal line; and
  transmitting the one or more commands received from the first device to the second device from an IR emitter of the AV cable.

15. The method of claim 14, further comprising:
switching from the first mode to the second mode based on a pulse transmitted on the at least one signal line.

16. The method of claim 14, further comprising:
switching from the first mode to the second mode based on sensing a current on the at least one signal line.

17. The method of claim 14, further comprising:
switching from the first mode to the second mode based on sensing a voltage on the at least one signal line.

18. The method of claim 14, further comprising:
switching from the first mode to the second mode for a temporary duration.

19. The method of claim 13, wherein the AV cable is a High-Definition Multimedia Interface (HDMI) cable.

20. The method of claim 13, wherein the at least signal line is at least one of an HDMI Ethernet Audio Control (HEAC) signal line, an Audio Return Channel (ARC) signal line, a Display Data Channel (DDC) signal line, or a Consumer Electronics Control (CEC) signal line.

\* \* \* \* \*